(12) United States Patent
Fawls et al.

(10) Patent No.: US 7,571,109 B2
(45) Date of Patent: Aug. 4, 2009

(54) SYSTEM AND METHOD FOR ASSESSING OPERATIONAL PROCESS RISK AND QUALITY BY CALCULATING OPERATIONAL VALUE AT RISK

(76) Inventors: Robert A. Fawls, 321 Eliot St., Milton, MA (US) 02186; Fred E. Sommers, 80 Hope Ave., Suite 314, Waltham, MA (US) 02453

( * ) Notice: Subject to any disclaimer, the term of this patent is extended or adjusted under 35 U.S.C. 154(b) by 0 days.

(21) Appl. No.: 11/487,129

(22) Filed: Jul. 14, 2006

(65) Prior Publication Data

US 2008/0015920 A1    Jan. 17, 2008

(51) Int. Cl.
G05B 19/418    (2006.01)
(52) U.S. Cl. ........................................... 705/8
(58) Field of Classification Search .................. 705/8
See application file for complete search history.

(56) References Cited

U.S. PATENT DOCUMENTS

| | | | |
|---|---|---|---|
| 4,903,201 A | 2/1990 | Wagner | |
| 5,187,787 A | 2/1993 | Skeen et al. | |
| 6,125,196 A | 9/2000 | Carey et al. | |
| 6,190,287 B1 * | 2/2001 | Nashner | 482/8 |
| 6,304,858 B1 | 10/2001 | Mosler et al. | |
| 6,738,931 B1 | 5/2004 | Osborn et al. | |
| 6,766,304 B2 | 7/2004 | Kemp, II et al. | |
| 6,772,132 B1 | 8/2004 | Kemp, II et al. | |
| 6,789,046 B1 * | 9/2004 | Murstein et al. | 702/182 |
| 6,828,968 B1 | 12/2004 | Tenorio | |
| 6,856,973 B1 | 2/2005 | Bott | |
| 6,895,383 B2 | 5/2005 | Heinrich | |
| 6,904,328 B2 | 6/2005 | Rietman et al. | |
| 6,965,886 B2 | 11/2005 | Govrin et al. | |
| 6,975,963 B2 | 12/2005 | Hamilton et al. | |
| 6,978,270 B1 | 12/2005 | Carty et al. | |
| 6,983,266 B1 | 1/2006 | Goldschmidt | |
| 6,993,454 B1 | 1/2006 | Murstein et al. | |
| 7,111,059 B1 * | 9/2006 | Garcea et al. | 709/224 |
| 7,136,827 B2 * | 11/2006 | Eicher | 705/10 |
| 7,318,038 B2 * | 1/2008 | Labbi | 705/7 |
| 2002/0147671 A1 * | 10/2002 | Sloan et al. | 705/36 |

(Continued)

FOREIGN PATENT DOCUMENTS

WO    WO 2004/053754 A1 *    6/2004

OTHER PUBLICATIONS

Clarke, Christopher J. et al., Strategic Risk Management: the New Compettitive Edge Long Range Planning, vol. 32, No. 4, 1999, pp. 414-424.*

(Continued)

*Primary Examiner*—Scott L Jarrett
(74) *Attorney, Agent, or Firm*—Cesari and McKenna, LLP

(57) ABSTRACT

Methods and apparatus for assessing operational process quality and risk of an entity or a group of entities. The present invention enables a user to effectively compare one or more events, representing what actually happened, with a reference, which represents ideal performance in terms of operational process quality and risk, and express the corresponding results in quantitative terms. The present invention is capable of presenting results in a form and with sufficient rapidity that a human decision-maker is able to timely observe conditions which represent unacceptable quality or excessive risk and respond appropriately.

17 Claims, 5 Drawing Sheets

U.S. PATENT DOCUMENTS

| | | | |
|---|---|---|---|
| 2003/0023543 A1* | 1/2003 | Gunewardena et al. | 705/38 |
| 2003/0061152 A1* | 3/2003 | De et al. | 705/38 |
| 2003/0088510 A1* | 5/2003 | Yokota et al. | 705/38 |
| 2003/0149657 A1* | 8/2003 | Reynolds et al. | 705/38 |
| 2003/0182337 A1* | 9/2003 | Wefers et al. | 708/490 |
| 2004/0054563 A1* | 3/2004 | Douglas | 705/7 |
| 2005/0021360 A1* | 1/2005 | Miller et al. | 705/1 |
| 2005/0027645 A1* | 2/2005 | Lui et al. | 705/38 |
| 2005/0065754 A1* | 3/2005 | Schaf et al. | 702/188 |
| 2005/0154769 A1* | 7/2005 | Eckart et al. | 707/201 |
| 2006/0100958 A1* | 5/2006 | Cheng et al. | 705/38 |
| 2006/0116945 A1* | 6/2006 | Nishikawa | 705/35 |
| 2006/0224500 A1* | 10/2006 | Stane et al. | 705/38 |
| 2006/0235774 A1* | 10/2006 | Campbell et al. | 705/30 |
| 2007/0208600 A1* | 9/2007 | Babus et al. | 705/7 |
| 2007/0239496 A1* | 10/2007 | Supatgiat et al. | 705/7 |

OTHER PUBLICATIONS

Consultative Document Operational Risk Basel Committee on Banking Supervision, Jan. 2001.*
Cumming, Christine M, The challenges of risk management in diversified financial companies Economic Policy Review—Federal Reserve Bank of New York, Mar. 31, 2001.*
Working Paper on the Regulatory Treatment of Operational Risk Basel Committee on Banking Supervison, Sep. 2001.*
Insurance of Operational Risk Under the New Basel Captial Accord—A Working Paper Submitted by Insure Companies Nov. 7, 2001.*
Basis Point Group Launches Opera—Comprehensive Investment Operations Performance Measurement and Benchmarks Business Wire, Oct. 12, 2005.*
BPG goes to the Opera Wall Street & Technology, vol. 23, No. 12, Dec. 2005.*
Investment ops consultant intros new method for benchmarking Operations Management, vol. 12, No. 1, Jan. 2006.*
Basis Point Group Offers OPERA—Basel II, Improved Processing Risk Metrics Essential to Basel II Operational Risk Business Wire, Mar. 20, 2006.*
Basis Point Group Applies for Patent; Comprehensive Methods and Apparatus for Assessing Operational Process Wuality and Risk in Connection with Financial Services and Investment Management Organizations, Business Wire, Aug. 24, 2006.*
Angena.co.uk Web Pages—iRisk Agena, Apr. 2002, Retrieved from Archive.org Sep. 19, 2007.*
BasisPointGroup.com Web Pages Basis Point Group, LLC, Jan. 2002-Feb. 2003, Retrived from Archive.org Nov. 17, 2007.*
Ergometrics.com Web Pages Ergometrics, Mar. 2000, Retrieved from Archive.org Jan. 25, 2007.*
Jorion, Philippe, Value at Risk—Second Edition McGraw-Hill, 2001, ISBN: 0-07-135502-2.*
King, Jack L., Operational Risk: Measurement and Modeling John Wiley & Sons, 2001, ISBN: 0-471-85209-0.*
Hallock, Micah et al., Measuring Operational Risk Banking & Accounting Finance, vol. 14, No. 4, Summer 2001.*
Allen, Linda et al., Understanding Market, Credit and Operational Risk—The Value At Risk Approach Blackwell Publishing, 2004, ISBN 0-631-22709-1.*
"Basis Point Group Offers OPERA—BASEL II, Improved Processing Risk Metrics Essential to BASEL II Operational Risk," press release dated Mar. 20, 2006 from www.finanznachrichten.de/nachrichten-2006-03/artikel-6158264.asp; 3 pages.
"Operations Performance Measurement A Framework for Success," Fawls, Robert A., *Investment Management Review*, Feb. 2, 2006, 2 pages.
"OPERA Case Study Operations Improvements/Risk Reduction" Basis Point Group Brochure, 2006.
Basis Point Group Brochure re: "Strategy, Technology and Operations".
"OPERA Operations Performance Benchmarking Exclusively from Basis Point Group" flyer.
"Operational Risk Transfer Across Financial Sectors" The Joint Forum for Basel Committee on Banking Supervision, by The International Association of Insurance Supervisors, Aug. 2003.
"Sound Practices for the Management and Supervision of Operational Risk," Basel Committee on Banking Supervision, 23 pages, Dec. 2001.
"What about Underevaluating Operational Value at Risk in the Banking Sector?" Dionne, Georges and Hela Dahen, 46 pages, Sep. 2007.
"Operations, Controls and Audits," FDIC Trust Examination Manual, Section 2, 26 pages.
"An LDA-Based Advanced Measurement Approach for the Measurement of Operational Risk, Ideas Issues and Emerging Practices," Industry Technical Working Group on Operational Risk, May 29, 2003.
"The LDA-Based Advanced Measurement Approach for Operational Risk—Current and In Progress Practice," presentation by the International Technical Working Group for the RMG Conference, May 29, 2003.
"Leveraging Scenario Analysis in Operational Risk Management," presentation by the Federal Reserve Bank of New York, May 29-30, 2003.
"Calculating the operational Value-at-Risk by using the actuarial approach," from the Operational Value-at-Risk Software Library, prepared by Acrys Consult.
"Estimation of Operational Value-at-Risk in the Presence of Minimum Collection Thresholds" by Chernobai, Anna et al., 43 pages, Sep. 9, 2006.
"Outside Service Provider Review Process," prepared by Jamadar, Gulrez et al., 50 pages, May 8, 2002.
"An Extended CreditRisk Approach to Operational Risk, Risk Measures and Capital Allocation," presentation by Richard Warnung, Sep. 15, 2006.
"Guide to the Sarbanes-Oxley Act: Internal Control Reporting Requirements—Frequently Asked Questions Regarding Section 404," prepared by Protiviti Independent Risk Consulting, 109 pages, 2003.
"Best Practices in Quality & Compliance Management," prepared by MetricSteam, 52 pages.
"The Invention of Operational Risk," by Michael Power, 21 pages, Jun. 2003.
"Explaining Settlement Fails," Fleming, Michael J. and Kenneth D. Garbade, *Federal Reserve Bank of New York*, vol. 11, No. 9, Sep. 2005.
"AMA Conference Federal Reserve Bank of Boston," presentation May 20, 2005.
"Implementation of an Operational Risk Framework," presentation by Newberry, Jim, 22 pages, May 30, 2003.
"Framework for Internal Control Systems in Banking Organisations," prepared by the Basle Committee on Banking Supervision, Sep. 1998.
"Operational Risk Management," prepared by the Basle Committee on Banking Supervision, Sep. 1998.
"Working Paper on the Regulatory Treatment of Operational Risk," prepared by the Basel Committee on Banking Supervision, Sep. 2001.
"Using Six Sigma to Improve Credit and Financial Management Competitiveness," by De Lurgio, Stephen, Credit & Financial Management Review, Third Quarter, 2004.
"AIMR Performance Presentation Standards Handbook" Association for Investment Management and Research, Second Edition, 1997.
"International Convergence of Capital Measurement and Capital Standards A Revised Framework" prepared by the Basel Committee on Banking Supervision, Nov. 2005.
*Aerodynamics for Engineering Students*, Houghton, E.L. and A.E. Brock, St. Martin's Press, New York 1970, 458 pages.
"Risk Management of Outsourced Technology Services: A Starting Point", RLR Management Consulting, Inc., 6 pages.
"Patent Overview—System and Method for Assessing Operational Process Risk and Quality", Basis Point Group, LLC, Dec. 3, 2008, 38 pages.

* cited by examiner

SYSTEM AND METHOD FOR ASSESSING OPERATIONAL PROCESS RISK AND QUALITY BY CALCULATING OPERATIONAL VALUE AT RISK

BACKGROUND OF THE INVENTION

1. Field of the Invention

The present invention relates generally to the field of process quality and risk assessment and, more specifically, to operational process quality and risk assessment in connection with financial services, and investment management organizations.

2. Background Information

Businesses which provide financial or investment management services are subject to a wide range of legal requirements which apply to their operational processes. Such requirements, which are typically statutory, regulatory or contractual in nature, govern or impact most aspects of the operations of such businesses. While some of these requirements are applicable to the business as a whole, many of them are applicable at the level of a single account holder or single account.

Under ideal conditions, a business should be in compliance with all legal requirements at all times. However, in a large enterprise which is maintaining hundreds of is thousands or millions of accounts, and processing tens or hundreds of millions of transactions, it is foreseeable that good faith mistakes will occur which represent at least technical violations of one or more legal requirements. Of course, there is also the possibility of deliberate wrongdoing which results in a violation of a legal requirement and may constitute a crime.

Regardless of the underlying cause of a failure to comply with a legal requirement, the business may face substantial liability to aggrieved account holders or other businesses which are parties to particular transactions. In addition, regulatory agencies may assess sanctions. To avoid or at least minimize the possibility of such liability, a business needs to know, at a given point in time or over a selected time period, to what degree it is in compliance with pertinent legal requirements. Stated another way, a business needs a capability to assess its operational process quality and risk.

SUMMARY OF THE INVENTION

In brief summary, the present invention provides methods and apparatus for assessing operational process quality and risk of an entity or a group of entities. The present invention enables a user to effectively compare one or more events (what actually happened) with a reference (what was supposed to happen), which represents ideal performance in terms of operational process quality and risk, and express the corresponding results in quantitative terms. The present invention is capable of presenting results in a form and with sufficient rapidity that a human decision-maker is able to timely observe conditions which represent unacceptable quality or excessive risk and respond appropriately.

The present invention provides a system interface through which events and other data are gathered from selected sources; a database or other data structure in which event, reference information or other data are stored; a library of operational process quality and risk metrics which may be selected by a user and applied to a specified set of data in the data store; and a user interface through which results are displayed to a user and through which a user may specify inquiries that are of interest.

In one aspect of the invention, events are logged to the data store based on a predefined time period and resolution for a given entity. Selected reference metrics and operational process quality and risk metrics are then applied to the event data to calculate the operational value at risk for the predefined time period and resolution for the given entity. In addition, event data in the data store may be dynamically aggregated to effectively represent larger time periods, larger time resolutions and groups of entities.

The present invention may be advantageously used in a wide variety of ways. For example, the present invention may be used to assess and monitor the aggregate operational risk associated with failing to comply with regulatory, contractual or other expectations attached to transactions involving the movement or exchange of cash, securities, assets or liabilities. A brokerage firm, investment management firm, hedge fund, mutual fund firm or other type of financial services organization may use the present invention to monitor operational risk, essentially in real-time, at any desired resolution ranging from an individual customer's single account or group of accounts, to an entire mutual fund, or the organization as a whole.

In similar fashion, the present invention may be used to assess or compare the performances, in terms of operational risk, of different business units or different organizations and their respective operational practices. The results of such comparisons may be used to measure and attribute operations performance, to identify and prioritize operational and system improvement opportunities, to calculate operating risk capital allocations or reserves to establish premiums or benchmarks for insurance underwriting purposes, to distribute performance-based compensation or any of a number of other purposes.

BRIEF DESCRIPTION OF THE DRAWINGS

The invention description below refers to the accompanying drawings, of which.

DETAILED DESCRIPTION OF AN ILLUSTRATIVE EMBODIMENT

As used in the specification and claims herein, the italicized terms are defined as follows:

*entity* means a natural person, account or any organization which holds a legal, beneficial, contractual, regulatory or other interest in or obligation with respect to a financial instrument;

*financial instrument* means cash, a security, an asset or a liability;

*event* means an action, transaction or omission with respect to a financial instrument that affects the value of an entity;

*basis point* means a quantitative expression of financial risk associated with one or more events;

*process* means one or more events which follow from or are necessary to initiate, sustain, maintain or terminate a legal, beneficial, contractual, regulatory or other interest or obligation in a financial instrument;

*process measure* means one or more logical expressions used to calculate operational process quality and risk metric;

metric includes a factor, dimension or other indicator of operational process quality or risk;

rule means one or more logical expressions which represent an express, implied or mandated legal requirement or other expectation;

factor means a quantitative expression which has a known relationship to an entity; and dimension means a selected combination of factors that provides a view of a process.

Figure 1:
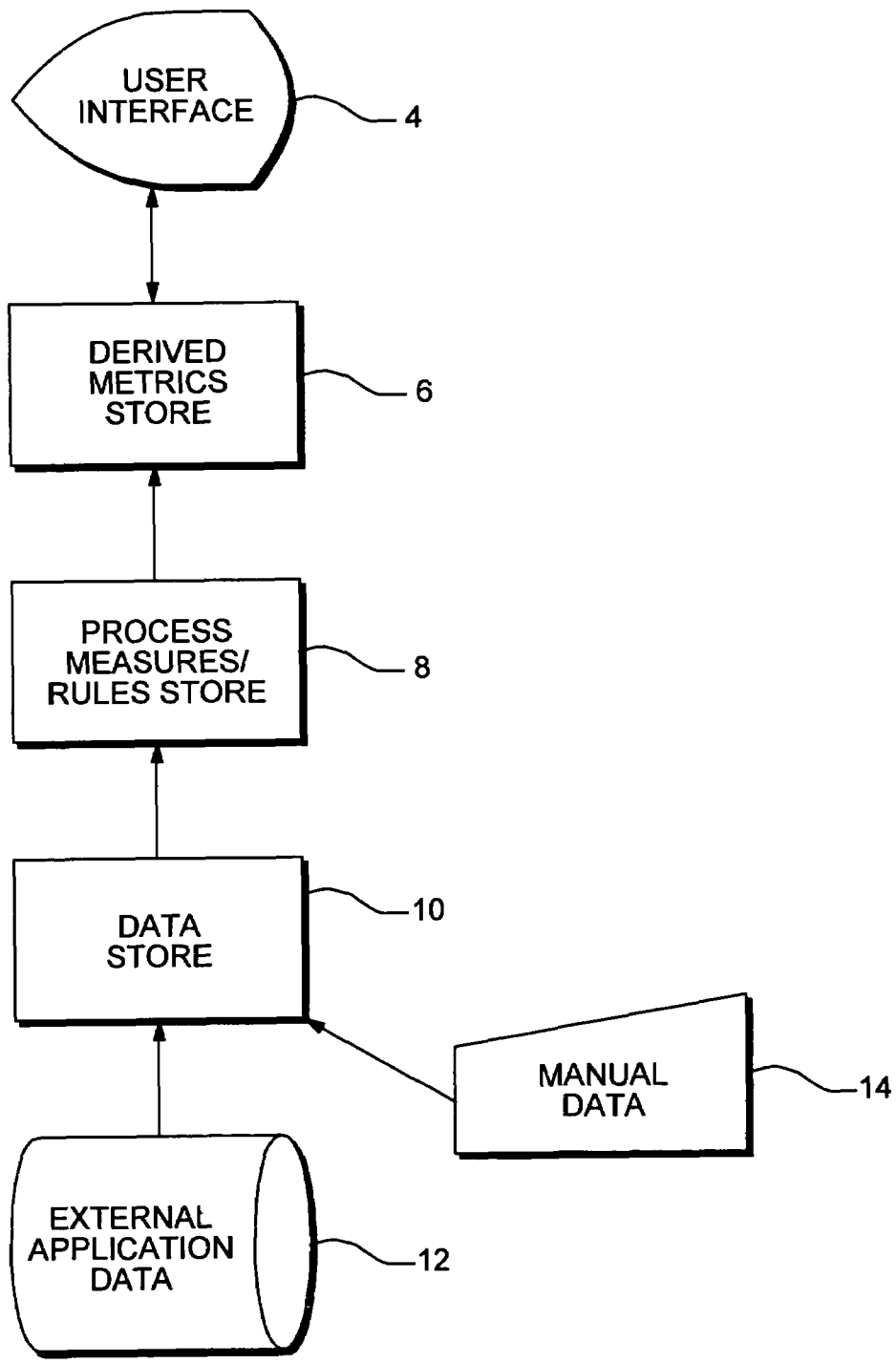
FIG. 1 is a block diagram of an apparatus for assessing operational process quality and risk constructed in accordance with a preferred embodiment of the present invention.

FIG. 1 shows in block diagram form a system 2 for assessing operational process quality and risk in a financial or investment management services business. As used herein, unless otherwise indicated, the terms "operational process quality" and "operational process risk" are used interchangeably. A user interface 4 is coupled to a store 6 which contains derived metrics. A process measures/rules store 8 is also coupled to derived metrics store 6. A data store 10, which is coupled to process measures/rules store 8, is arranged to receive and store external application data 12 and manually input data 14 which represent events.

In general, system 2 may be implemented in the form of a software application which runs on conventional computer hardware as either a standalone application or within a client/server environment. For example, user interface 4 may be implemented in the form of a graphical user interface (GUI) through which a user, employing a conventional keyboard, mouse or other device, may enter data or commands, manipulate a display, print and the like. In general, derived metrics store 6, process measures/rules store 8 and data store 10 may be implemented using conventional computer memory (RAM), a hard disk or other mass storage media (or a combination thereof) along with conventional database software or other conventional software.

The overall operation of system 2 will now be described. Metrics store 6 contains one or more metrics which pertain to a process for which a user wishes to assess the quality and risk. For example, a metric for assessing the quality and risk of managing a brokerage account is the elapsed time between when a trade is executed and settlement.

Process measures/rules store 8 contains one or more rules which pertain to the process of interest to the user. In the brokerage account context, an example of a rule is that a trade of a security must be settled on the third business day after the trade was executed.

Data store 10 is used to store information regarding entities, events and financial instruments which are related to the process for which a user wishes to assess the quality and risk. The information contained in data store 10 may be obtained from sources which are external to system 2 (e.g., transactions posted to an account) or may be input manually by the user or both.

In general, through interaction with user interface 4, a user may assess operational process quality or risk in the following manner. The user selects at least one metric of interest. Certain process measures/rules, contained in store 8, which pertain to the selected metric are applied to selected event data contained in data store 10. Event data may be selected based upon user-specified criteria such as time period, entity or entities of interest and the like. Event data may also be selected automatically.

The application of process measures/rules, which represent what was supposed to happen under ideal conditions, to selected event data, which represent what actually happened, produces intermediate results which are passed to the selected metric. Based on the intermediate results, a process metric calculates an operational value at risk metric expressed in basis points. The expression of operational risk in basis points provides at least two significant advantages. First, a basis point is a quantitative unit that is familiar to and generally understood by persons in the fields of financial and investment management services. Second, the expression of operational risk in this fashion becomes an instantly recognizable warning: the larger the magnitude, the greater the risk (or lower the quality).

Figure 2:
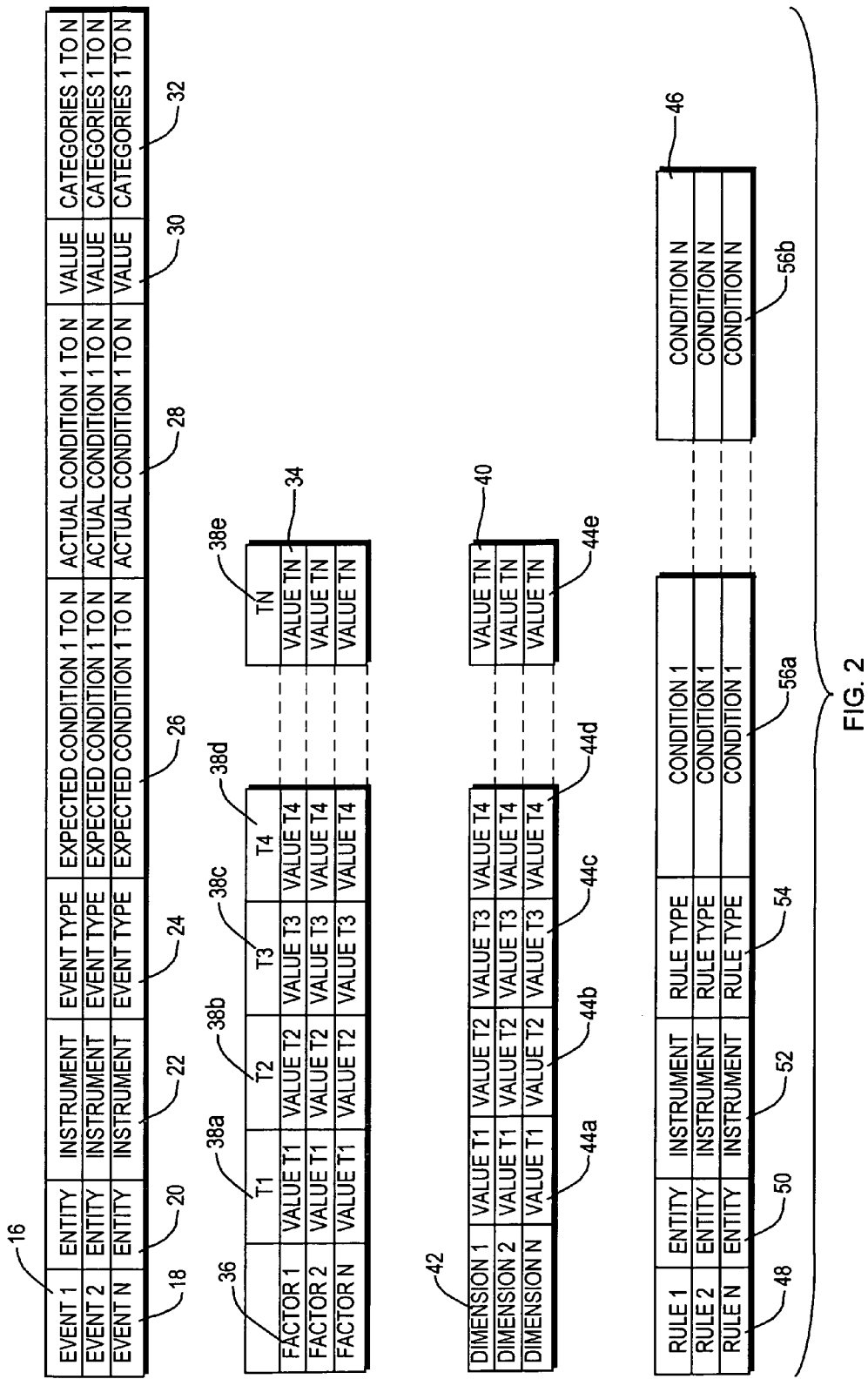
FIG. 2 is a simplified diagram of records in a database which may be used to implement various stores shown in FIG. 1.

FIG. 2 shows examples of records which may be used to organize information contained in stores 6, 8 and 10 of FIG. 1. An event record 16 may be used to organize information related to events in the form of database records contained in data store 10. Each event record 16 includes an event identifier 18, an entity identifier 20, a financial instrument identifier 22, an event type 24, one or more expected conditions 26, one or more actual conditions 28, a value 30 and one or more categories 32.

Event identifier 18 comprises a number or other information which serves as a unique identifier of a particular event. Entity identifier 20 comprises a number or other information which serves as a unique identifier of a particular entity or possibly a group of entities. Similarly, financial instrument identifier 22 comprises a number or other information which uniquely identifies a particular financial instrument to which the identified event relates. Each expected condition 26 represents something which, under normal circumstances, should occur in connection the identified event while each actual condition 28 represents what did occur. Value 30 comprises a number or other information which represents value of the identified financial instrument. Each category 32 may represent an asset type, geographic location, portfolio type or other characteristic of interest.

A factor record 34 may be used to organize information related to factors in the form of database records contained in metrics store 6. Each factor record 34 includes a factor identifier 36 which comprises a number or other information that serves as a unique identifier of a particular factor. Each factor record also includes one or more values 38a-38e which correspond, respectively, to the value of the factor at different points in time T1, T2 . . . TN. Similarly, a dimension record 40 includes a dimension identifier 42, which is used to uniquely identify a dimension, as well as values 44a-44e which correspond, respectively, to the value of the dimension at different points in time T1, T2 . . . TN.

A rule record 46 may be used to organize information related to rules in the form of database records contained in process measures/rules store 8. Each rule record includes a rule identifier 48, an entity identifier 50, a financial instrument identifier 52, a rule type 54 and one or more conditions 56a-56b which correspond, respectively, to conditions 1 . . . N. Rule identifier 48 comprises a number or other information that serves as a unique identifier of a particular rule. Entity identifier 50 and financial instrument identifier 52 are comparable to identifiers 20 and 22, respectively, discussed above. Rule type 54 comprises a number or other information which characterizes the nature of the rule (e.g., contractual, regulatory, express, implied, etc.). Each of conditions 56 represents something which is required to be done in connection with the identified rule.

Figure 3:
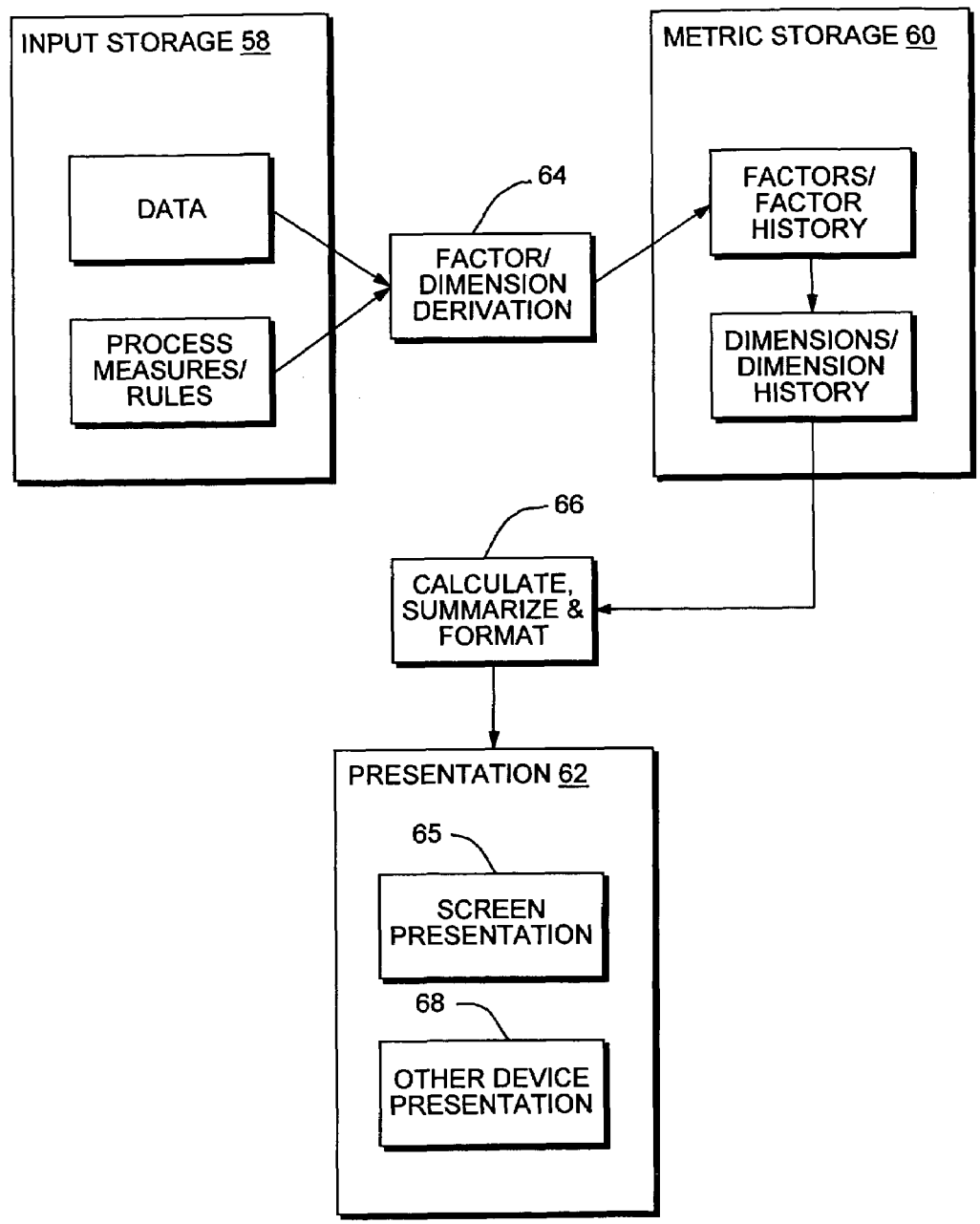
FIG. 3 is a block diagram illustrating a high level software architecture for the apparatus of FIG. 1.

FIG. 3 shows a series of process modules which when used together provide a method for using the apparatus of FIG. 1 to assess operational process quality and risk. An input storage module 58 contains or has access to both process measures/rules contained within process measures/rules store 8 and data regarding entities, events and financial instruments contained within data store 10. Pertinent data and rules are supplied to a processing module 64 which functions to derive factor and dimensions which are useful for quality or risk assessment of a process of interest. Metric storage module 60 contains or has access to the derived factors and dimensions as well as their respective histories.

In module 66, factors and dimensions of interest are calculated (i.e., a quantitative value is calculated at one or more points in time), the results summarized and formatted as appropriate before being passed to a presentation module 62.

Presentation module 62 is responsible for displaying the results as a screen presentation 65 or other device presentation 68.

Figure 4:
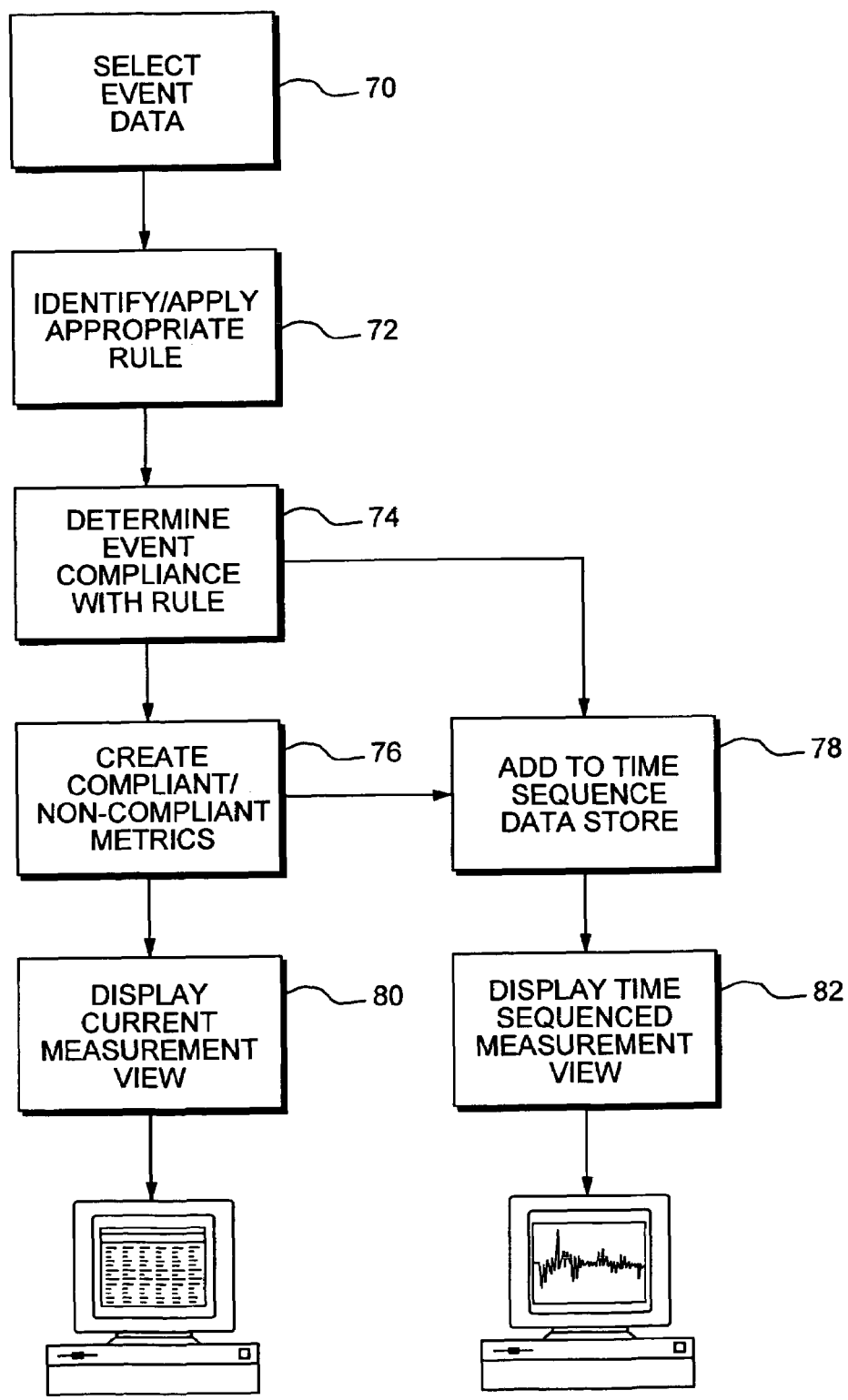
FIG. 4 is a flowchart showing an exemplary method for using the apparatus of FIG. 1 to assess operational process quality and risk.

FIG. 4 is a flowchart illustrating a method of assessing operational process quality and risk using the system of FIG. 1. At step 70, data representing one or more events is selected by a user. At step 72, one or more rules, appropriate to the entity, event or financial instrument associated with the event chosen in the operational process of interest, is applied to the data selected in step 70. At step 74, a determination is made as to the degree to which the actual operational process, evidenced by the events, complied with the applicable rule or rules. The outcome of the determination will be that the event analyzed either complies with the requirement represented by the rule (or rules) or it does not. The results of the determination made at step 74 are used at step 76 to cumulate the results for the chosen time period into groupings of compliant/non-compliant quantity performance and risk metrics by event into factors, dimensions and indexes that represent measures of operating performance and risk. These results are aggregated and sorted and the results are displayed to a user at step 80 as a measurement view for the time period of interest (i.e., a graphical display of operational process quality and risk at a moment in time). The method may be used to represent a static time period or may be updated continuously as new events become known to the methods analysis and comparison process or apparatus.

The results of the determination made at step 74 are also, at step 78, added to a time sequence data store, which serves to aggregate results. The application of the compliant/non-compliant metrics to the time sequence data store are displayed to a user at step 82 as a time sequenced measurement view (i.e., a graphical display of operational process quality and risk over a period of time which may be selected or varied by the user).

Some examples of how the apparatus and methods described above may be used to assess operational process quality and risk will now be described. An example of the practical risk and quality metrics include the measurement of process performance of the financial instrument trade settlement process based on the measured value at risk as a result of a non-compliant trade event. An investment firm might wish to determine the value at risk in its operational process resulting from the failure to appropriately record each and every trade settlement event on the contractual settlement date established for the specific event. This contractual rule would be used to test each trade settlement event by comparing the posting date-time stamp data element recorded, for the specific trade settlement event, with the contractual settlement date data element established for the specific trade settlement event to determine whether the event is compliant or non-compliant with the contractual rule.

If an event is non-compliant with the contractual rule, the trade settlement dollar-value data element recorded for the specific trade settlement event may be divided by the total value of all the trade settlement events with the same user specified time period or contractual settlement date. The resultant value for the specific non-compliant event may then be expressed as a basis point value for display to a user. Further, the total value of all non-compliant events may be divided by the total value of all the trade settlement events with the same contractual settlement date and the resultant value for all non-compliant events expressed as a basis point value.

In another example, a bank might wish to determine the quality in its cash wire-transfer deposit operational process resulting from the failure to appropriately record each and every cash wire-transfer deposit into a beneficiary account on the contractual funds-availability date established for the specific cash wire-transfer deposit event. This contractual rule would be used to test each cash wire-transfer deposit into a beneficiary account by comparing the posting date-time stamp data element recorded for the specific cash wire-transfer deposit into a beneficiary account with the fund-availability date data element established for this cash wire-transfer deposit event to determine whether the event is compliant or non-compliant with the contractual rule.

If an event is non-compliant with the contractual rule, the cash wire-transfer deposit dollar-value data element recorded for the specific cash wire-transfer deposit event may be divided by the total value of all the cash wire-transfer deposit events with the same funds-availability date. The resultant value for the specific non-compliant event may then be expressed as a basis point value. Further, the total value of all non-compliant events would be divided by the total value of all the cash wire-transfer deposit events with the same funds-availability date. The resultant value for all non-compliant events may then be expressed as a basis point value.

In a third example, an investment firm may wish to compare the current value of the difference between its financial instrument records and the financial instrument records of a client's custodian bank. Each financial instrument event is recorded by the investment firm and the custodian bank, both acting for the client. At a minimum, each records a group of data elements which include a data element equivalent to a mutual client identifier; a financial instrument identifier; a financial instrument currency identifier; a number of financial instrument settlement units; a financial instrument settlement value; and a financial instrument contractual settlement date, for each event.

As of a specific contractual settlement date using the individual event data elements, both the investment firm and the custodian bank accumulate the total financial instrument holdings for the client's account. The investment firm compares its accumulated financial instrument holdings for the client account to the accumulated financial instrument holdings for the same client account information obtained from the custodian bank. In instances where the accumulated number of financial instrument settlement units data elements do not match, they are identified as non-compliant with the contractual settlement rule. The financial instrument settlement value data element of all non-compliant financial instrument holdings is accumulated. This total value of non-compliant settlement date holdings would be divided by the total value of all the financial instrument settlement date holdings. The resultant value for the specific non-compliant holdings would be expressed as a basis point value.

In another example, a firm may wish to compare the current and past operating performance of an individual subsidiary having different financial or investment objectives against other subsidiaries and against competitors. Utilizing metrics derived by this method, including the measures like those described in the prior examples, the firms have a means to compare differences in operational risks, utilizing one or more of the methods factors, dimensions or indices that quantify the operational risk effects, normalized to account for differences in common industry comparison categories such as firm size, investment style, automation method and process organization.

Figure 5:
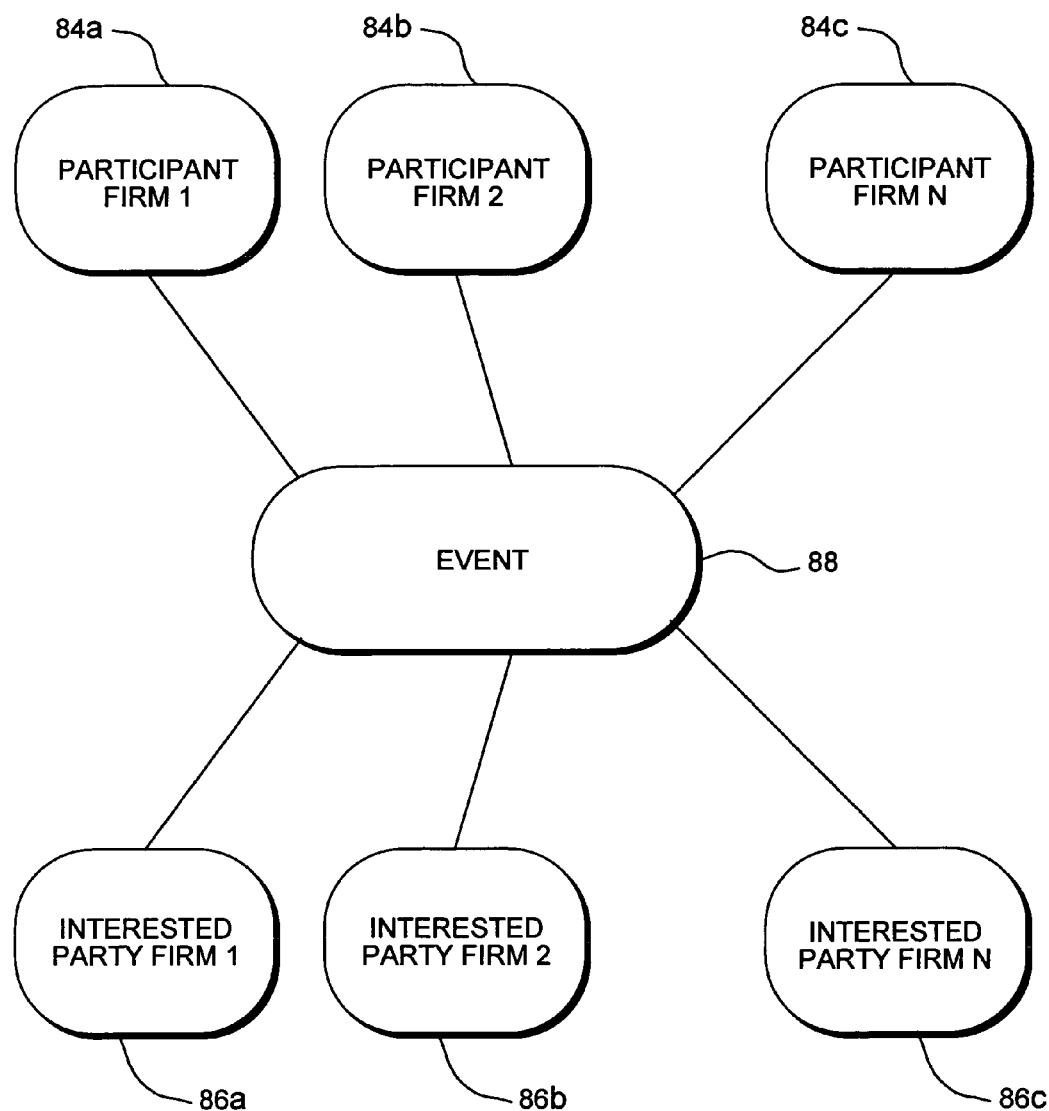
FIG. 5 is a block diagram illustrating the relationships among active participant firms and interested party firms to a common event.

FIG. 5 shows that multiple participant firms 84*a*, 84*b*, and 84*c* are typically involved in assuring a financial event 88 is properly completed. In addition, other interested party firms 86*a*, 86*b*, and 86*c* have an interest in information about the event even though they may not actively participate in the financial aspects of the event. Each participant firm and interested party firm is exposed to some level of operating risk and potential financial loss based on the relationship each has to the event and the techniques each firm employs to collect, enter, store and utilize information about the event.

An example of the different relationships that firms have to a single event is an equity trade in a security listed on a registered stock exchange. The active participants include the investment manager that decides the security that should be purchased or sold; the broker with whom the trade is actually completed; the exchange on which the broker places the trade execution; the clearing corporation that assures transfer of title to the securities that have been traded; the custodian that settles the trade with the broker based on instructions from the investment manager; the client account in which the trade is made; and the trust department of a local bank charged with responsibility for oversight of the finds in the client's account. The active participants may have operating rules in common as well as rules that are unique to each event. Measures of process quality and risk, at any specific point in time, can be calculated for each firm for each specific event or group of events by utilizing the rules that are applicable to the operation of each individual firm.

What is claimed is:

1. A method for assessing operational process quality comprising the steps of:

identifying at least one entity which holds a legal, beneficial, contractual, regulatory or other interest in or obligation with respect to a financial instrument and at least one metric which has substantial correlation to operational process quality for a preselected operational process of said at least one entity, wherein said metric includes one or more factors or dimensions each of which is represented by a combination of an identifier and one or more values which correspond, respectively, to one or more values of the factors or dimensions at different points in time;

preselecting at least one operational process for quality assessment, wherein said operational process comprises one or more events which follow from or are necessary to initiate, sustain, maintain or terminate a legal, beneficial, contractual, regulatory or other interest or obligation with respect to a financial instrument;

obtaining data from one or more sources which represent at least one actual initial condition for said at least one entity;

continuously observing, for a preselected period of time, events which relate to said at least one entity and which represent actual performance of said preselected operational process, wherein each of said events comprises an action, transaction or omission with respect to a financial instrument that affects the value of said at least one entity;

applying said metric to said data and events;

processing said metric, using at least one processor of a computer system, to generate results which represent a comparison of actual performance of said operational process with ideal performance in terms of operational process quality for said at least one entity, wherein said ideal performance is defined by at least one rule and said comparison comprises a determination whether each of said events is compliant with said at least one rule, wherein said at least one rule comprises one or more logical expressions which represent an express, implied or mandated legal requirement or other expectation;

calculating, using said at least one processor of said computer system, an operational value at risk based on said generated results for said at least one entity; and expressing substantially in real-time, using a graphical display of said computer system, said calculated operational value at risk for said at least one entity in quantitative terms, whereby a condition which represents a potential loss for said at least one entity is identified prior to recognition of an actual loss occurring.

2. A method for assessing operational process quality comprising the steps of:

selecting at least one entity which holds a legal, beneficial, contractual, regulatory or other interest in or obligation with respect to at least one financial instrument and at least one metric with respect to a preselected operational process of interest of said at least one entity, said at least one metric having substantial correlation to operational process quality for said operational process, wherein said at least one metric includes one or more factors or dimensions each of which is represented by a combination of an identifier and one or more values which correspond, respectively, to one or more values of the factors or dimensions at different points in time, and wherein said preselected operational process comprises one or more events which follow from or are necessary to initiate, sustain, maintain or terminate a legal, beneficial, contractual, regulatory or other interest or obligation with respect to a financial instrument;

obtaining data from one or more sources which represent at least one actual initial condition for said at least one entity;

selecting event data which represent continuous observations of the actual performance of the preselected operational process of interest during a time period of interest wherein each of said events comprises an action, transaction or omission with respect to said at least one financial instrument that affects the value of said at least one entity;

applying, using at least one processor of a computer system, one or more process metrics and rules, which represent ideal performance of the operational process of interest in terms of quality, to the selected event data to produce intermediate results, wherein the intermediate results represent a comparison of actual performance of said operational process with ideal performance in terms of operational process quality for said at least one entity, wherein said ideal performance is defined by at least one rule and said comparison comprises a determination whether each of said events is compliant with said at least one rule, wherein said at least one rule comprises one or more logical expressions which represent an express, implied or mandated legal requirement or other expectation, wherein said at least one process measure comprises one or more logical expressions used to calculate operational process quality; and applying the selected metric to said intermediate results, using said at least one processor of a computer system, to calculate an operational value at risk in quantitative terms, whereby a condition which represents a potential loss for said at least one entity is identified prior to recognition of an actual loss occurring.

3. A computer readable medium, including program instructions executing on at least one processor of a computer, the computer readable medium including program instructions for a method for assessing operational process quality comprising:

providing a data store, using a computer memory or computer data storage device, which contains data pertaining to at least one entity which holds a legal, beneficial, contractual, regulatory or other interest in or obligation with respect to at least one financial instrument and one or more events which represent continuous observations of the actual performance of a preselected operational process of interest, wherein each of said events comprises an action, transaction or omission with respect to said at least one financial instrument that affects the value of said at least one entity and data from one or more sources which represent at least one actual initial condition for said at least one entity;

providing a process measures and rules store, using said computer memory or computer data storage device, which contains at least one process measure and at least one rule pertaining to said preselected operational process of interest;

applying, using at least one processor of a computer system, said at least one process measure and at least one rule to selected data from said data store to generate intermediate results which represent a comparison of actual performance of said preselected operational process with ideal performance in terms of operational process quality for said at least one entity, wherein said ideal performance is defined by at least one rule and said comparison comprises a determination whether each of said events is compliant with said at least one rule, wherein said at least one rule comprises one or more logical expressions which represent an express, implied or mandated legal requirement or other expectation;

providing a metric store, using said computer memory or computer data storage device, which contains at least one metric having substantial correlation to operational process quality for said operational process of interest, wherein said at least one metric includes one or more factors or dimensions each of which is represented by a combination of an identifier and one or more values which correspond, respectively, to one or more values of the factors or dimensions at different points in time;

applying said at least one metric to said intermediate results to calculate, using said at least one processor of a computer system, an operational value at risk for said at least one entity; and expressing substantially in real-time, using a graphical display of said computer system, said calculated operational value at risk in quantitative terms, whereby a condition which represents a potential loss for said at least one entity is identified prior to recognition of an actual loss occurring.

4. A computer system for assessing operational process quality comprising:

at least one computer memory or computer data storage device comprising a data store for data which is related to at least one entity which holds a legal, beneficial, contractual, regulatory or other interest in or obligation with respect to at least one financial instrument and one or more events which represent continuous observations of the actual performance of a preselected operational process, wherein each event comprises an action, transaction or omission with respect to said at least one financial instrument that affects the value of said at least one entity and data from one or more sources which represent at least one actual initial condition for said at least one entity;

said at least one computer memory or computer data storage device further comprising a process measures and rules store, coupled in communicating relationship with said data store, for applying at least one process measure and at least one rule to selected data of interest in said data store to produce intermediate results which represent a comparison of actual performance of said operational process with ideal performance in terms of operational process quality for said at least one entity, wherein said ideal performance is defined by at least one rule and said comparison comprises a determination whether each of said events is compliant with said at least one rule, wherein said at least one rule comprises one or more logical expressions which represent an express, implied or mandated legal requirement or other expectation;

said at least one computer memory or computer data storage device further comprising a metric store, coupled in communicating relationship with said process measures and rules store, for receiving said intermediate results and applying a selected metric to said intermediate results to calculate an operational value at risk for said at least one entity expressed in quantitative terms, said metric having substantial correlation to operational process quality for an operational process of interest, wherein said metric includes one or more factors or dimensions each of which is represented by a combination of an identifier and one or more values which correspond, respectively, to one or more values of the factors or dimensions at different points in time; and a user interface, coupled in communicating relationship with said metric store, for enabling a user to select one or more metrics of interest and to display said calculated operational value at risk, whereby a condition which represents a potential loss for said at least one entity is identified prior to recognition of an actual loss occurring.

5. A computer system for assessing operational process quality comprising:

at least one computer memory or computer data storage device comprising a first store containing at least one metric pertaining to an operational process of interest, said at least one metric having substantial correlation to operational process quality for said operational process of interest, wherein said at least one metric includes one or more factors or dimensions each of which is represented by a combination of an identifier and one or more values which correspond, respectively, to one or more values of the factors or dimensions at different points in time;

said at least one computer memory or computer data storage device further comprising a second store containing observed event data which represent actual performance of the operational process of interest during a time period of interest;

said at least one computer memory or computer data storage device further comprising a third store, coupled in communicating relationship with said second store, containing one or more process measures and rules which represent ideal performance of the operational process of interest in terms of quality;

a processor for applying said one or more process measures and rules to selected event data to generate intermediate results and applying said at least one metric to said intermediate results to calculate an operational value at risk wherein the intermediate results represent a comparison of actual performance of said operational process with ideal performance in terms of operational process quality for said at least one entity, wherein said ideal performance is defined by at least one rule and said comparison comprises a determination whether each of said events is compliant with said at least one rule, wherein said at least one rule comprises one or more logical expressions which represent an express, implied or mandated legal requirement or other expectationl; and a user interface, coupled in communicating relationship with said first store, for enabling a user to select one or more metrics of interest and to display said calculated operational value at risk, whereby a condition which represents a potential loss for said at least one entity is identified prior to recognition of an actual loss occurring.

6. A computer system for assessing operational process quality comprising:

at least one computer memory or computer data storage device comprising a first store containing at least one metric which has substantial correlation to operational process quality for a preselected operational process, wherein said at least one metric includes one or more factors or dimensions each of which is represented by a combination of an identifier and one or more values which correspond, respectively, to one or more values of the factors or dimensions at different points in time;

said at least one computer memory or computer data storage device comprising a second store, coupled in communicating relationship with said first store, containing event data received from one or more sources which represent actual performance of said preselected operational process for at least one entity which holds a legal, beneficial, contractual, regulatory or other interest in or obligation with respect to at least one financial instrument;

a processor for processing said metric using selected event data from said second store to generate results which represent a comparison of actual performance of said operational process with ideal performance in terms of operational process quality or risk, wherein said ideal performance is defined by at least one rule and said comparison comprises a determination whether each of one or more events is compliant with said at least one rule, wherein said at least one rule comprises one or more logical expressions which represent an express, implied or mandated legal requirement or other expectation;

calculating an operational value at risk based on said generated results; and a user interface for expressing substantially in real-time said calculated operational value at risk in quantitative terms, whereby a condition which represents a potential loss for said at least one entity is identified prior to recognition of an actual loss occurring.

7. A method for assessing operational process quality comprising the steps of:

identifying a plurality of entities each of which holds a legal, beneficial, contractual, regulatory or other interest in or obligation with respect to a financial instrument;

preselecting at least one operational process for quality assessment;

identifying, for said at least one operational process, at least one metric which has substantial correlation to operational process quality for said preselected at least one operational process, wherein said at least one metric includes one or more factors or dimensions each of which is represented by a combination of an identifier and one or more values which correspond, respectively, to one or more values of the factors or dimensions at different points in time;

obtaining data from one or more sources which represent at least one actual initial condition for each of said entities;

continuously observing, for a preselected period of time, events which relate to all of said entities and which represent actual performance of said preselected operational process, wherein each of said events comprises an action, transaction or omission with respect to said financial instrument that affects the value of all of said entities;

applying said metric to said data and events;

processing said at least one metric, using at least one processor of a computer system, to generate results which represent a comparison of actual performance of said operational process with ideal performance in terms of operational process quality or risk for each of said entities, wherein said ideal performance is defined by at least one rule and said comparison comprises a determination whether each of said events is compliant with said at least one rule, wherein said at least one rule comprises one or more logical expressions which represent an express, implied or mandated legal requirement or other expectation;

calculating, using said at least one processor of said computer system, an operational value at risk for each of said entities based on said generated results; and expressing substantially in real-time, using a graphical display of said computer system, said calculated operational value at risk for at least one of said entities in quantitative terms, whereby a condition which represents a potential loss for said at least one entity is identified prior to recognition of an actual loss occurring.

8. The method as in claim 1, 2, 3 or 7 wherein said quantitative terms comprises basis points.

9. The method as in claim 1, 2, 3 or 7 wherein an event is represented by a combination of an event identifier, an entity identifier, a financial instrument identifier, one or more expected conditions, one or more actual conditions, a value and a category.

10. The method as in claim 1, 2, 3 or 7 wherein said rule is represented by a combination of a rule identifier, an entity identifier, an instrument identifier, a rule type and one or more conditions.

11. The method as in claim 1, 2, 3 or 10 wherein said method is used to assess the operational process quality associated with failing to comply with regulatory, contractual or other expectations attached to transactions involving one or more financial instruments.

12. The method as in claim 1, 2, 3 or 10 wherein said method is used to compare performances, in terms of operational quality, of two or more business organizations.

13. The method as in claim 1, 2, 3 or 7 wherein said method is used to measure and attribute operations performance.

14. The method as in claim 1, 2, 3 or 7 wherein said method is used to identify and prioritize operational and system improvement opportunities.

15. The method as in claim 1, 2, 3 or 7 wherein said method is used to calculate operating risk capital allocations or reserves to establish premiums or benchmarks for insurance underwriting purposes.

16. The method as in claim 1, 2, 3 or 7 wherein said method is used to distribute performance-based compensation.

17. The method as in claim 1, 2, 3 or 10 wherein said quantitative terms are calculated using a total value of the legal, beneficial, contractual, regulatory or other interest or obligation of a respective entity.

* * * * *